(12) United States Patent
Croux (10) Patent No.: US 9,670,773 B2
(45) Date of Patent: Jun. 6, 2017

(54) ACOUSTIC COMMUNICATIONS NETWORK WITH FREQUENCY DIVERSIFICATION

(71) Applicant: Schlumberger Technology Corporation, Sugar land, TX (US)

(72) Inventor: Arnaud Croux, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/818,270

(22) Filed: Aug. 4, 2015

(65) Prior Publication Data
US 2016/0047236 A1 Feb. 18, 2016
US 2016/0258285 A9 Sep. 8, 2016

(30) Foreign Application Priority Data

Aug. 3, 2014 (EP) .................................... 14290228

(51) Int. Cl.
*E21B 47/16* (2006.01)
*H04B 11/00* (2006.01)

(52) U.S. Cl.
CPC .............. *E21B 47/16* (2013.01); *H04B 11/00* (2013.01)

(58) Field of Classification Search
CPC ................................ E21B 47/16; H04B 11/00
See application file for complete search history.

(56) References Cited

U.S. PATENT DOCUMENTS

| 6,188,715 | B1 | 2/2001 | Partyka |
| 6,747,569 | B2 | 6/2004 | Hill et al. |
| 6,847,585 | B2 | 1/2005 | Macpherson |
| 7,224,713 | B2 | 5/2007 | Partyka |
| 7,265,682 | B2 | 9/2007 | Memarzadeh et al. |
| 7,590,029 | B2 | 9/2009 | Tingley |
| 2010/0008189 | A1 | 1/2010 | Tingley |
| 2010/0039286 | A1 | 2/2010 | Robbins |
| 2010/0295702 | A1 | 11/2010 | Zhao et al. |
| 2011/0158050 | A1 | 6/2011 | Merino et al. |

(Continued)

FOREIGN PATENT DOCUMENTS

| WO | 2013/126054 | 8/2013 |
| WO | 2015161371 A1 | 10/2015 |
| WO | 2015161372 A1 | 10/2015 |

OTHER PUBLICATIONS

M.A. Gutierrez-Estevez, et al, "Acoustic Broadband Communications over Deep Drill Strings using Adaptive OFDM," 2013 IEEE Wireless Communications and Networking Conference (WCNC), Apr. 10, 2013, pp. 4089-4094.

(Continued)

*Primary Examiner* — Sisay Yacob
(74) *Attorney, Agent, or Firm* — Cameron R. Sneddon; Diana Sangalli (57) ABSTRACT

An acoustic communications network includes acoustic modems that exchange messages on an acoustic communications medium, such as tubing deployed in a wellbore. The acoustic communications medium is characterized by an acoustic transfer function having a plurality of passbands and a plurality of stopbands. The messages are communicated by encoding the message into a plurality of symbols representing the message and distributing the plurality of symbols across a bandwidth of a wideband acoustic signal that spans at least one passband and at least one stopband of the acoustic transfer function.

19 Claims, 5 Drawing Sheets

(56) References Cited

U.S. PATENT DOCUMENTS

| | | |
|---|---|---|
| 2011/0176387 A1 | 7/2011 | Froelich |
| 2011/0205080 A1 | 8/2011 | Millot et al. |
| 2011/0205847 A1 | 8/2011 | Lemenager |
| 2012/0250461 A1 | 10/2012 | Millot et al. |
| 2013/0257629 A1 | 10/2013 | Hallundbæk |
| 2014/0085098 A1 | 3/2014 | Stolpman et al. |
| 2015/0159482 A1 | 6/2015 | Xu |
| 2015/0229439 A1 | 8/2015 | Stolpman et al. |
| 2015/0275657 A1 | 10/2015 | Deffenbaugh et al. |
| 2015/0292319 A1 | 10/2015 | Disko et al. |

OTHER PUBLICATIONS

A.A. Nimbalkar, et al, "Reliability in underwater inter-vehicle communications," Proceedings of the Third ACM International Workshop on Wireless Network Testbeds, Experimental Evaluation and Characterization, WUWNET '08, Jan. 1, 2008, pp. 19-26.

European Search Report issued in EP14290228.7-1860 on Feb. 10, 2015, 14 pages.

ACOUSTIC COMMUNICATIONS NETWORK WITH FREQUENCY DIVERSIFICATION

CROSS-REFERENCE TO RELATED APPLICATIONS

This application claims priority to European Patent Application No. 14290228.7 filed Aug. 13, 2014, which is herein incorporated by reference.

BACKGROUND

Field

The present disclosure relates to techniques for communicating in downhole environments. More particularly, the present disclosure relates to methods and devices for communicating in a network of wireless communication devices.

Description of the Related Art

Hydrocarbon fluids, including oil and natural gas, can be obtained from a subterranean geologic formation, referred to as a reservoir, by drilling a wellbore that penetrates the formation. Once a wellbore is drilled, various well completion components are installed to enable and control the production of fluids from the reservoir. Data representative of various downhole parameters, such as downhole pressure and temperature, are often monitored and communicated to the surface during operations before, during and after completion of the well, such as during drilling, perforating, fracturing and well testing operations. In addition, control information often is communicated from the surface to various downhole components to enable, control or modify the downhole operations.

Accurate and reliable communications between the surface and downhole components during operations can be difficult. Wired, or wireline, communication systems can be used in which electrical or optical signals are transmitted via a cable. However, the cable used to transmit the communications generally require complex connections at pipe joints and to traverse certain downhole components, such as packers. In addition, the use of a wireline tool is an invasive technique which can interrupt production or affect other operations being performed in the wellbore. Thus, wireless communication systems can be used to overcome these issues.

An example of a wireless system is an acoustic communication system. In acoustic systems, information or messages are exchanged between downhole components and surface systems using acoustic transmission mediums. As an example, a network of acoustic devices can be deployed downhole that uses tubing in the wellbore as the medium for transmitting information acoustically.

SUMMARY

The present disclosure describes a method of communicating in a borehole, where a message is transmitted via an acoustic communications medium between acoustic modems deployed in the borehole. The acoustic communications medium is characterized by an acoustic transfer function having a plurality of passbands and a plurality of stopbands. The message can be transmitted by encoding the message into a plurality of symbols representing the message, and distributing the symbols across a bandwidth of a wideband acoustic signal. In various embodiments, the bandwidth spans at least one passband and at least one stopband of the acoustic transfer function. The wideband acoustic signal is received and processed to recover the message from the plurality of symbols.

The present disclosure also describes a method of transmitting messages in an acoustic communications network. A first message contained in a first wideband acoustic signal is transmitted from a first acoustic modem in a network of acoustic modems deployed along an acoustic transmission medium. According to the method, the message is addressed to a second acoustic modem and contains information to be ret-transmitted by the second acoustic modem. A third acoustic modem determines whether the second (addressed) acoustic modem has received the first message. If not, the third acoustic modem transmits a second message that contains the information that was to be re-transmitted by the second acoustic modem.

The present disclosure further describes a system for performing a downhole operation in a wellbore. The system includes a control and telemetry system that is located at a surface to control and monitor a downhole operation. Downhole equipment is located in the wellbore to observe a parameter of interest associated with the downhole operation. First and second acoustic modems are coupled to an acoustic transmission medium at locations extending between the control and telemetry system and the downhole equipment. The acoustic transmission medium has an acoustic frequency response having passbands and stopbands. In response to receipt of a message from the control and telemetry system directed to the downhole equipment, the first acoustic modem generates information representing the message, distributes the information across a bandwidth that spans at least one passband and at least one stopband of the acoustic frequency response to generate a wideband signal, and acoustically transmits the wideband signal to the second acoustic modem.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments are described with reference to the accompanying drawings, wherein like reference numerals denote like elements. It should be understood, however, that the accompanying drawings illustrate the various implementations described herein and are not meant to limit the scope of various technologies described herein. The drawings show and describe various embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Wireless communication networks can be used to transmit information or messages between, for instance, a control and telemetry system and various tools or other devices. When a wireless communication network is used in a hydrocarbon exploration, testing or production environment, the control and telemetry system typically is located at the surface and the tools or other devices are located downhole in a wellbore. The tools and devices are referred to as downhole equipment and can include, for example, packers, valves, chokes, firing heads, perforators, samplers, pressure gauges, temperature sensors, flow meters, fluid analyzers, etc. Messages exchanged between the surface system and the downhole equipment can be used to operate the equipment (e.g., a valve, firing head, etc.) to control the performance of a downhole operation or to monitor various downhole conditions before, during or after an operation, such as fluid flow, tool status, temperature, pressure, fluid composition, etc.

One type of wireless communications network that can be used to exchange messages between the surface and downhole equipment is an acoustic communication network. In a downhole environment, the messages are propagated through a network using acoustic modems to transmit and receive the messages. An elastic structure in the wellbore, such as a drill string, pipe string, production tubing or casing, provides the acoustic transmission medium that carries the messages. Typically, the network is established by connecting a plurality of acoustic modems to the transmission medium (e.g., tubing) at spaced apart locations. For instance, the modems can be mounted in carriers that are attached to the tubing, although other mounting arrangements, including direct mounting arrangements, are possible and contemplated. Each modem includes a transducer that can convert an electrical signal to an acoustic signal (or message) that is then communicated using the tubing as the transmission medium. Each modem also has a receiving system (e.g., a transducer or accelerometer) that can convert an acoustic signal to an electrical signal. Each modem has the ability to convert signals from analog form to digital form and includes a processing system to process digital data, including, for example, a microcontroller and/or a programmable gate array. Generally, an acoustic modem receives a message and processes it. If the message is locally addressed to the receiving modem, the receiving modem can manage the information (e.g., a command) carried in the message. If the receiving modem is the ultimate destination, it executes the command. Otherwise, the modem retransmits the message along the transmission medium to the next addressed modem. This process repeats so that the message continues to propagate to its ultimate destination.

In the illustrative embodiments described herein, the messages that are exchanged between the surface and the downhole equipment can encompass control signals, commands, polls for data, data regarding tool status, data indicative of parameters monitored by sensors, etc. In general, the messages that are communicated are made up of a sequence of digital bits. To transmit the bits between components, the bits are transformed into a form suitable for acoustic transmission. That is the bits are transformed so that the information can be carried on an acoustic wave that propagates along the elastic structure that serves as the acoustic transmission medium. The technique for performing the transformation is generally referred to as modulation.

Figure 1:
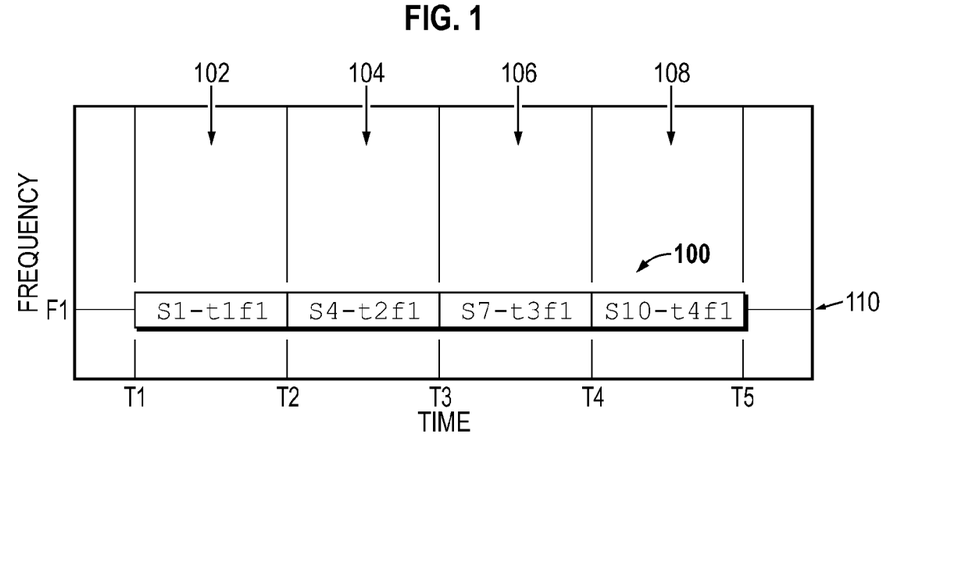
FIG. 1 shows an example of a single carrier modulation technique.

One form of modulation is single carrier modulation, which can be used when the messages are to be carried by an acoustic wave at a single carrier frequency. For single carrier modulation, the transformation process transforms the sequence of bits that make up a message by encoding the bits and using time division multiplexing. An example of a single carrier modulation technique is illustrated in FIG. 1 in which the bits of a message 100 are encoded into symbols and transmitted in time slots (e.g., time slots 102, 104, 106, 108) on a single carrier frequency 110. In FIG. 1, the vertical axis represents frequency and the horizontal axis represents time.

Single carrier modulation techniques can be used for acoustic communications. However, a limiting factor of single carrier modulation is the selection of an appropriate carrier frequency. When used for acoustic communications, the characteristics of the elastic structures that make up the acoustic transmission path affect the signal that is carried on the path and, thus, also affect selection of an appropriate acoustic carrier frequency. For instance, various acoustic frequencies may be subject to substantial fading on the transmission path, rendering them unsuitable as reliable carrier frequencies. Other frequencies are not subject to significant fading, and thus are suitable as acoustic carriers. The acoustic transmission characteristics of the transmission structure is referred to as the acoustic transfer function.

Figure 2:
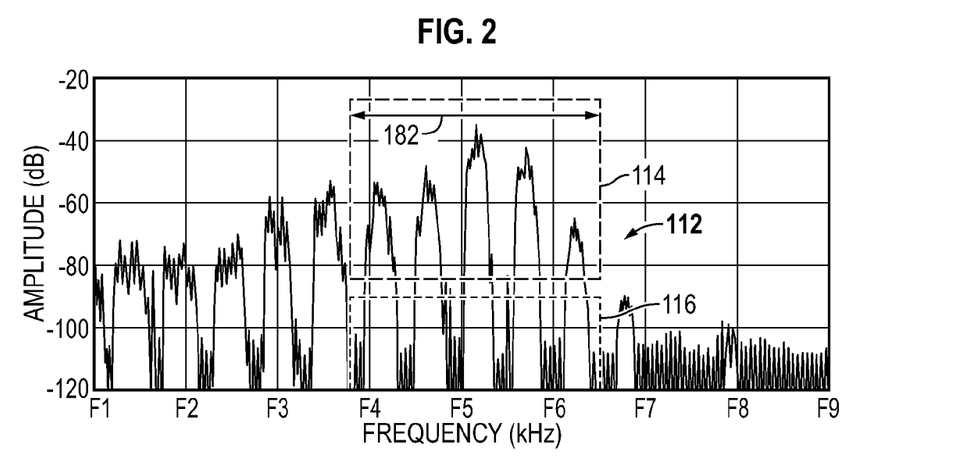
FIG. 2 shows an example of an acoustic transfer function of a string of pipe.

An example of an acoustic transfer function 112 for a transmission structure that is deployed in a hydrocarbon wellbore is shown in FIG. 2. In this example, the transmission structure is 1000 feet of production tubing. The graph in FIG. 2 represents the response of the transmission structure to a frequency chirp or sweep. The graph plots amplitude of the transfer function along the vertical axis versus frequency along the horizontal axis. The higher amplitude region 114 of the transfer function 112 encompasses passbands, which are the frequency bands in which a signal reliably may be transmitted. The lower amplitude region 116 of the transfer function 112 encompasses stopbands, which are the frequency bands in which a signal cannot be reliably transmitted. In general, the majority of the energy in the acoustic signal is present in the passbands, while mostly noise is present in the stopbands. As an example, more than 95% of the acoustic energy can be present in the passband region 112 in FIG. 2. When single carrier modulation is used, if a reliable carrier frequency or frequencies is (are) not properly selected for all portions of the network, then communications on the network cannot be achieved. Because the location of passbands and stopbands depends on the properties of the acoustic transmission medium (e.g., tubing lengths; connection or joint dimensions; material properties), there can be significant risk of selecting an unsuitable frequency or frequencies when using a single carrier modulation technique.

However, in many instances, it is difficult to predict the transfer function of the acoustic transmission path before the network is actually installed, which makes it difficult to select the optimal carrier frequency. A further complicating factor is that the optimal carrier frequency may not be the same for all portions of the acoustic transmission path. For instance, in a wellbore, the characteristics of the tubular string that is used for the transmission path vary along its length as different sections of the string often have structural characteristics (e.g., different pipe lengths) that are different than other sections. Thus, in many implementations of an acoustic network, different acoustic carrier frequencies are selected for different portions of the communications path.

Various algorithms and methods have been developed for selecting a carrier frequency during what is referred to as "network discovery," which occurs after the network has been installed. However, such techniques are time-consuming as they rely, to some extent, on trial and error procedures performed on the in situ transmission structure (e.g., a tubular string). During the discovery period of a wellbore installation, other operations cannot be performed and downhole telemetry information is not available. In the hydrocarbon production business, any delay or downtime in testing or completing a well, performing an operation or any interruption of production, is very costly.

Accordingly, techniques and systems described herein are directed to reducing the start up time of an acoustic communications network and, particularly, an acoustic downhole control and telemetry system. In the illustrative embodiments described herein, the acoustic communications network can be established without a priori knowledge of the acoustic characteristics of the transmission path and without performing trial and error procedures to discover a suitable acoustic carrier frequency or frequencies that will enable reliable exchange of information over the acoustic network. The techniques and systems described herein can also provide for more reliable communications and increased data transmission rates through the acoustic network, thus providing additional efficiencies in the performance of various operations and test procedures.

Rather than rely on a single carrier, embodiments described herein employ frequency diversification techniques to effect communications on the communications path in an acoustic communications network. In general, frequency diversification refers to a wideband signal carried on a communications channel that spans a range of frequencies. The bandwidth of the wideband signal can span at least one passband, or both one or more passbands and one or more stopbands. Different modulation techniques can be used to spread or distribute the information across the bandwidth and, thus, to achieve the wideband communication channel. Such techniques include, for example, spread spectrum techniques (e.g., frequency hopping) and orthogonal frequency division multiplexing (OFDM), where multiple, closely spaced orthogonal subcarrier signals are used to carry the bits of information in parallel channels or streams.

Figure 3:
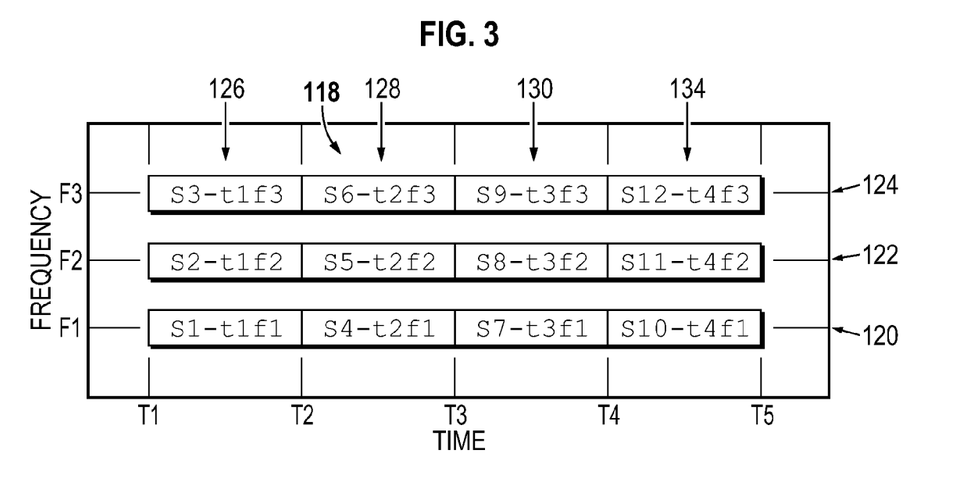
FIG. 3 shows an example of a multi-carrier modulation technique.

In general, OFDM can be thought of as multiple single carrier modulations that are transmitted and received in parallel at the same time. Each single carrier modulated signal is called a "subcarrier" of the multi-carrier modulated signal. An example of an OFDM wideband signal 118 is shown in FIG. 3. In this example, three subcarriers 120, 122, 124 are represented for ease of illustration. However, it should be understood that any number of subcarriers can be used within the bandwidth, such as 10 subcarriers, 100 subcarriers, 1000 subcarriers, etc. Regardless of the number of subcarriers, the bandwidth of each subcarrier signal is small compared to the bandwidth of a passband or stopband of the frequency response of the acoustic channel. As a result, many subcarriers (e.g., more than 10) generally are located in one passband or stopband.

When OFDM is used as the modulation technique, the subcarriers are orthogonal to one another. Orthogonality ensures that the subcarriers do not interfere with one another.

In the OFDM scheme in FIG. 3, information representing a message is distributed across the three orthogonal subcarrier frequencies 120, 122, 124, and time division multiplexing is used on each one. That is, each subcarrier frequency 120, 122, 124 is divided into time periods (e.g., periods 126, 128, 130, 132), and a portion of the information representing the message 118 is carried in each time period 126, 128, 130, 132 of each subcarrier 120, 122, 124.

In the scheme shown in FIG. 3, the sequence of bits representing the original message has been encoded and mapped to symbols and twelve of the symbols are shown distributed within the four periods 126, 128, 130, 132 over the three subcarriers 120, 122, 124. A variety of constellation mapping techniques are available for mapping bits to symbols based, for instance, on amplitude and phase information. These techniques include phase shift keying, amplitude shift keying, a combination of phase shift and amplitude shift keying, or other mapping technique. In general, a fixed number of bits can be mapped to one symbol, where the number of bits depends on the type of mapping scheme used. For example, when a Quadrature Phase Shift Keying (QPSK) mapping scheme is used, two bits can be mapped into one symbol.

In embodiments described herein, various error correction coding and processing techniques can be used with frequency diversification to code the sequence of bits of the original signal into encoded bits that are then mapped to the symbols. Error correction coding can increase the likelihood that the original message can be recovered at the receiver. As examples, the error correction coding and processing can include Forward Error Correction (FEC) coding, maximal combining ratio coding, and other suitable coding techniques or combinations of techniques known or that may be become available.

In general, FEC encodes or transforms a sequence of bits into a longer sequence of different bits. The encoding process results in each of the original bits being reflected (in part) in each of the new (encoded) bits, thus intrinsically providing for redundancy in the transmitted information. As a result, if some of the encoded bits are lost or corrupted during transmission (e.g., due to noise or frequency fading), the original bits may still be recovered from the remaining bits in the decoding process. FEC coding can include block coding, convolutional coding, can be systematic, or not systematic. When FEC is used with frequency diversification, the original sequence of bits is encoded and then distributed across the bandwidth of the acoustic signal. For example, when OFDM is used, the information representing the original message can be distributed over different time slots and different subcarrier frequencies in the frequency band of the wideband channel.

Maximal combining ratio coding techniques, on the other hand, rely on actual redundancy to increase the likelihood that information can be recovered. For example, the complete information representing the original message is transmitted multiple times, thus increasing the probability that the original message can be recovered. When used with frequency diversification, the same symbols representing the original information can be transmitted on multiple subcarrier frequencies. In other words, the message is transmitted multiple times. Upon receipt by the decoder, soft information regarding the received symbols can be determined (e.g., frequency, phase, norm, etc.) and then used to weight the received symbols. The weighting provides an indication of reliability or confidence that the symbol has been properly received. The weighted symbols on each of the subcarriers can then be mathematically combined to recover the original message.

Against this backdrop, illustrative embodiments of the systems and methods will be described herein where OFDM is used to transmit a single message or signal that spans a wideband region of the frequency response of the acoustic channel. While different types of encoding schemes and combinations of encoding schemes can be employed in conjunction with OFDM, illustrative embodiments will be described where both FEC and maximal combining ratio coding techniques are used to provide for more reliable communications on the transmission path. However, it should be understood that the frequency diversity techniques described herein can be implemented without error correction coding or with other coding schemes or combinations of schemes that facilitate reliable recovery of the original information from the transmitted wideband signal.

In various embodiments, the bandwidth of the wideband communications channel is selected so that it will cover at least one passband and one stopband of the acoustic channel, which means that the signal is wide enough so that at least some of the information will be distributed within a passband. Consequently, communications on the acoustic network can be established without a priori knowledge of the structural characteristics of the acoustic transmission medium (e.g., a string of pipes). Further, communications on the network can be established without performing a time-consuming (and disruptive) network discovery procedure. In other embodiments, such as embodiments in which the transfer function of the acoustic channel is known, the span of the bandwidth can be selected so that it substantially covers a passband region, but not a stopband or only part of a stopband. In any embodiment, FEC and/or maximal combining ratio techniques can be implemented to increase the probability that the original message can be recovered from the information that is distributed across the wideband channel.

Various implementations will now be described with reference to FIG. 4, which shows a schematic view of an acoustic communication network that is deployed in a hydrocarbon well. It should be understood that the systems and techniques described herein are applicable throughout the life of the well, including during drilling, logging, drill stem testing, fracturing, stimulation, completion, cementing and production.

Figure 4:
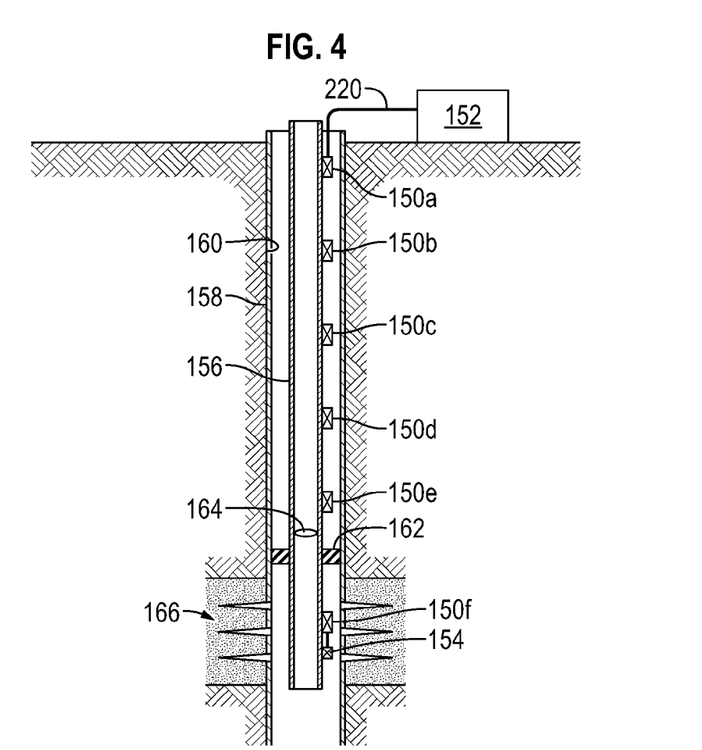
FIG. 4 is a schematic illustration of an acoustic communications network deployed in a wellbore, according to an embodiment.

Referring to FIG. 4, a network of modems 150*a-f* is deployed in a wellbore 160 so that communications can be exchanged between a surface control and telemetry system 152 and downhole equipment along both a downlink (from the surface to the downhole equipment) and an uplink (from the downhole equipment to the surface). The surface control and telemetry system 152 can include processing electronics, a memory or storage device and transceiver electronics to transmit and receive messages to and from the network of modems 150*a-f* via a wired connection 220. In various embodiments, the processing electronics can include a signal conditioner, filter, analog-to-digital converter, microcontroller, programmable gate array, etc. The memory or storage device can store telemetry data received from the downhole equipment so that it can be processed and analyzed at a later time. Yet further, the memory or storage device can store instructions of software for execution by the processing electronics to generate messages to control and monitor performance of a downhole operation.

The modems 150*a-f* are acoustically coupled to an elastic medium, such as tubing 156, which can be a jointed pipe string, production tubing or a drill string, that provides the acoustic communications path. It should be understood, however, that the elastic medium may be provided by other structures, such as a tubular casing 158 that is present in the wellbore 160.

Because of the acoustic loss that is inherent in the elastic medium (particularly over long distances), communications in one hop from surface to downhole and vice versa generally are not feasible. Thus, a network of modems 150*a-f* is deployed to effectuate the downlink and uplink paths, where the modems 150*a-f* repeat (and amplify or boost) the messages that propagate along the transmission path or tubing 156.

In addition to the modems 150*a-f*, the installation shown in FIG. 4 includes a packer 162 positioned on the tubing 156 at a region of interest 166. Various pieces of downhole equipment for testing and the like are connected to the tubing 156, either above or below the packer 162, such as a test valve 164 above the packer 162 and a sensor 154 below the packer 162.

Figure 5:
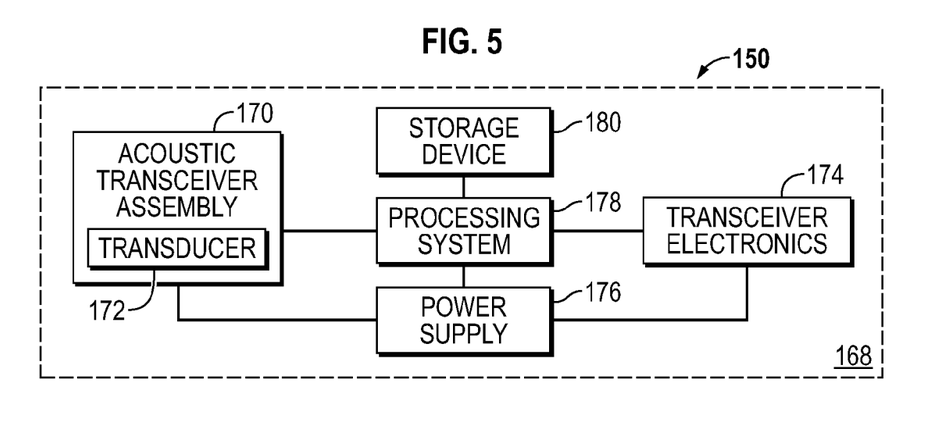
FIG. 5 is a schematic illustration of an acoustic modem, according to an embodiment.

The modems 150*a-f*, which are part of the acoustic communications network, are made of electrical and mechanical components that provide the ability to transmit and receive acoustic signals that are exchanged between the surface and the downhole equipment. A schematic illustration of a modem 150 is illustrated in FIG. 5. Modem 150 includes a housing 168 that supports an acoustic transceiver assembly 170 that includes electronics and a transducer 172 which can be driven to create an acoustic signal in the tubing 156 and/or excited by an acoustic signal received from the tubing 156 to generate an electrical signal. The transducer 172 can include, for example, a piezoelectric stack, a magneto restrictive element, and/or an accelerometer or any other element or combination of elements that are suitable for converting an acoustic signal to an electrical signal and/or converting an electrical signal to an acoustic signal. The modem 150 also includes transceiver electronics 174 for transmitting and receiving electrical signals. Power can be provided by a power supply 176, such as a lithium battery, although other types of power supplies are possible, including supply of power from a source external to the modem 150.

The transceiver electronics 174 are arranged to receive an electrical signal from and transmit an electrical signal to the downhole equipment, such as the sensor 154 and the valve 164. The electrical signal can be in the form of a digital signal that is provided to a processing system 178, which can encode and modulate the signal as will be described herein, amplify the signal as needed, and transmit the encoded, modulated, and amplified signal to the transceiver assembly 170. The transceiver assembly 170 generates a corresponding acoustic signal for transmission via the tubing 156.

The transceiver assembly 170 of the modem 150 also is configured to receive an acoustic signal transmitted along the tubing 156, such as by another modem 150. The transceiver assembly 170 converts the acoustic signal into an electric signal. The electric signal then can be passed on to processing system 178, which processes it for transmission as a digital signal to the downhole equipment. In various embodiments, the processing system 178 can include a signal conditioner, filter, analog-to-digital converter, demodulator, modulator, amplifier, encoder, decoder, microcontroller, programmable gate array, etc. The modem 150 also can include a memory or storage device 180 to store data received from the downhole equipment so that it can be transmitted or retrieved from the modem 150 at a later time. Yet further, the memory or storage device 180 can store instructions of software for execution by the processing system 178 to perform the various modulation, demodulation, encoding, decoding, etc. processes described above.

Returning again to FIG. 4, the acoustic channel provided between each pair of modems, such as modem 150a and modem 150b, has a characteristic transfer function that is composed of passbands (a frequency band in which signals are reliably transmitted along the channel) and stopbands (a frequency band in which signals are not reliably transmitted along the channel). Again, FIG. 2 shows an example of a transfer function 112, which is typical of a pipe string deployed in a hydrocarbon well, showing bands having widths in the range of 50 Hz to 150 Hz. The center frequencies of the bands depend on the configuration of the well. Generally, the pipe lengths and pipe joint dimensions of the pipe string are the main characteristics that drive the location of the center frequencies of the passbands and stopbands, which can be, as examples, anywhere in the range of 1 to 5 kHz.

Because the acoustic channel generally has a frequency-selective fading property, certain frequencies cannot be used to reliably convey acoustic energy along the channel. Those frequencies are located in the stopbands. Empirical data taken from various configurations of hydrocarbon wells shows that, in the range of frequencies from 500 Hz to 5000 Hz, more than 25% of the spectrum is located in passbands, which contain the frequencies that can be used to reliably convey information on the acoustic channel. Thus, when frequency diversity is used, there is no need to determine a single suitable carrier frequency because the information that makes up the message can be spread over a wide bandwidth in a manner that ensures that the original message can be recovered even though some of the information may be transmitted in regions of the acoustic channel that are subject to frequency-selective fading (i.e., the stopbands). The central frequency of the wideband signal can be chosen independently of the acoustic characteristics and configuration of the particular transmission medium and environment in which the acoustic network is deployed. Thus, the central frequency of the wideband signal can be chosen at the system design level based on parameters, such as average energy in the acoustic channels, expected power spectral density of acoustic noise that may be present in the environment, design of the piezoelectric sensor, etc. The central frequency can also be optimized based on the operation that will be performed. For example, if a drilling operation is to be performed, the drill pipes will have significantly different acoustic transfer functions than production tubing so that the central frequency for communications during a drilling operation may be different than the central frequency used for communications during production or testing.

In embodiments in which the acoustic network is implemented in a hydrocarbon well, the width of one passband typically is in the range of 50-150 Hz and the combined width of one passband and one stopband typically may span a region of 100-300 Hz. Thus, in embodiments in which the acoustic communications channel is configured to have a bandwidth that encompasses at least one passband and at least one stopband, the bandwidth of the wideband acoustic signal is at least 300 Hz. However, other bandwidths of the wideband acoustic signal are contemplated and can, for instance, have a span that is an order of magnitude larger, such as 1000 Hz to 2000 Hz. in the example illustrated in FIG. 2, the communications network is configured so that the bandwidth (represented by arrow 182) covers approximately three passbands and three stopbands. Thus, the components (e.g., symbols) of the wideband signal representing the information to be exchanged between the surface and the downhole equipment are spread across that bandwidth.

Any one of a variety of available modulation techniques, including spread spectrum techniques and OFDM, can be used to distribute the symbols across the bandwidth of the acoustic signal. When an encoding scheme, such as FEC, is used with the modulation techniques, such as OFDM, the original bits of the signal are encoded, mapped to symbols, and then multiplexed in time and frequency to spread the information across the bandwidth in a manner that provides for efficient and reliable recovery of the original information. The code rate of the encoding scheme (i.e., the ratio of encoded bits to original bits) is selected based on the bandwidth of the channel. That is, the code rate is selected so that it is sufficient to provide for reliable recovery of the original message even though a portion of the coded information is located in one or more stopbands.

Embodiments described herein can also employ an interleaver to randomize the location of the encoded information across the bandwidth, and, thus, to increase the time and frequency diversity of the communication scheme. Different types of interleavers can be used, including pseudo random interleaving, periodic interleaving and convolutional interleaving.

Figure 6:
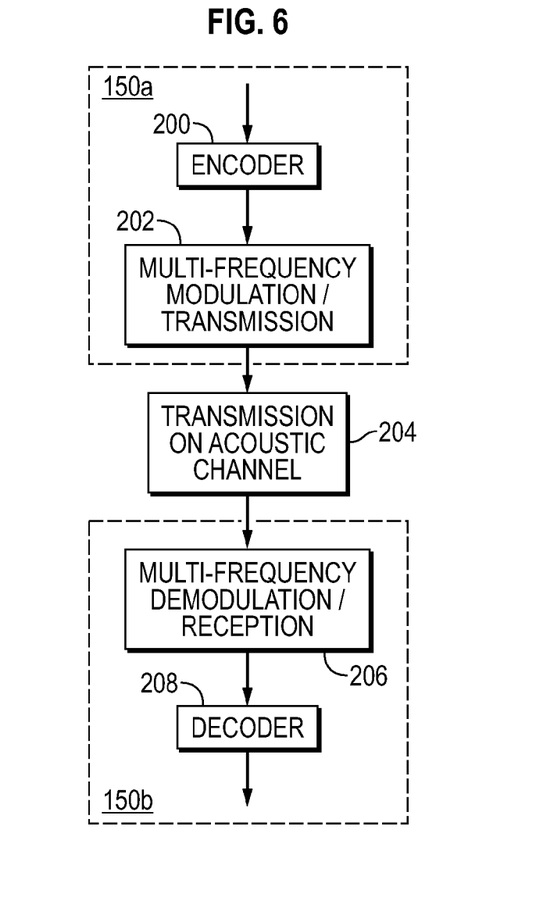
FIG. 6 is a block diagram illustrating a multi-carrier communication technique, according to an embodiment.

FIG. 6 is a block diagram of illustrative transmission and reception techniques that are implemented by and between modems 150 in the network in order to transmit a wideband signal representing a message. In block 200, the transmitting modem (e.g., modem 150a) applies an error coding scheme (e.g., FEC) to encode the sequence of "k" bits representing the original message into a sequence of "n" bits, where (n>k). In block 202, the "n" bits are then processed and modulated (e.g., mapped to symbols, multiplexed in time and frequency) for multi-frequency transmission as an acoustic message on the acoustic network.

During transmission on the network (block 204), the wideband acoustic signal is affected by the transfer function of the acoustic transmission medium and by noise that is present in the environment. At block 206, upon receipt of the wideband signal by the receiving modem (e.g., modem 150b), the receiver demodulates the symbols and calculates soft information characterizing the received symbols, such as frequency, phase, amplitude, norm, etc. The soft information is indicative of whether the received symbol has been properly received. For instance, if the received symbol is transmitted on a subcarrier that is located in a passband, then the amplitude of the symbol should be relatively high.

Thus, a high amplitude is indicative a high degree of confidence that the symbol is reliable.

The soft information is then provided to a decoder (block 208) to derive the original sequence of "k" bits that represents the message. If a convolutional coder was employed to code the original "k" bits at block 200, then the decoding in block 208 is performed by a convolutional decoder.

In some embodiments, the decoding in block 208 can be performed in two phases, where a convolutional decoder is employed in one of the phases and maximal combining ratio is employed in another of the phases. The soft information provides an indication of the reliability and, thus, can be used to weight the received symbols. The maximal combining ratio technique can then combine the weighted information received on the various subcarriers in order to increase the likelihood that the "k" original bits representing the message can be recovered. When convolutional decoding is used with a maximal combining ratio technique, the amount of redundant information that is included in the acoustic message can be reduced. Consequently, embodiments which employ both techniques in the decoding process can achieve higher data transmission rates.

Figure 7:
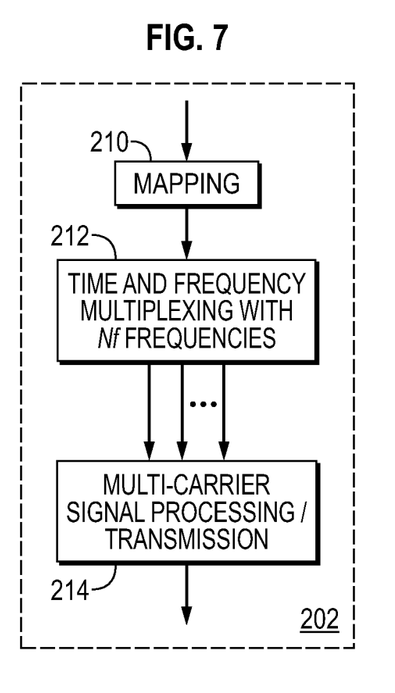
FIG. 7 is a block diagram illustrating further details of a multi-frequency modulation procedure of FIG. 6, according to an embodiment.

FIG. 7 is a block diagram providing additional detail regarding the processing performed in the multi-frequency modulation block 202 of FIG. 6. In block 210, the coded sequence of "n" bits is mapped to symbols using a constellation mapping scheme. In block 210, the mapping assumes that "M" bits are mapped to each symbol, so that a sequence of Ns=n/M symbols is generated. The sequence of Ns symbols is then time and frequency multiplexed with Nf frequencies (block 212), so that the wideband signal is represented by parallel Nf streams of Np=Ns/Nf symbols, where each Nf stream is to be transmitted on one of the subcarrier frequencies F1 . . . FNf. At block 214, the Np sets are processed for multi-carrier transmission on each of the acoustic subcarrier frequencies.

Figure 8:
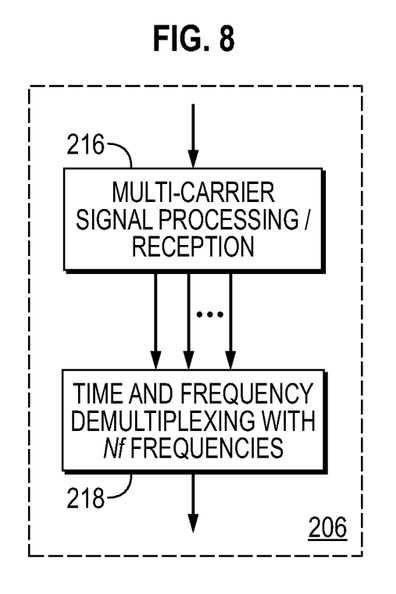
FIG. 8 is a block diagram illustrating further details of a multi-frequency demodulation procedure of FIG. 6, according to an embodiment.

FIG. 8 is a block diagram providing additional detail regarding the processing performed in the multi-frequency demodulation block 206 in the receiving modem of FIG. 6. The multi-carrier acoustic signal is received at block 216 and processed (e.g., to convert the received acoustic information into electrical information, synchronize the information between subcarriers, etc.) to derive parallel Nf streams of Np=Ns/Nf symbols. At block 218, the Nf streams are de-multiplexed in time and frequency to generate Ns sets of soft information representing the Ns symbols from which the original "k" bits of the message can be derived.

The procedure for deriving the soft information assumes that the modems 150a, 150b synchronize in time and frequency, which can be accomplished using known telecommunications techniques. The synchronization information can be carried in the preambles of the information conveyed on various of the subcarrier frequencies. Amplitude and phase references also can be calculated for all subcarriers of the multi-carrier signal in a "channel estimation" process. This information also can be carried in the preambles.

The synchronization and channel estimation information can then be used to derive the soft information for the received symbols. On each subcarrier frequency, each symbol is characterized by amplitude and phase. This amplitude and phase can be normalized by the reference phase and amplitude that has been estimated for that same subcarrier. The absolute and normalized values regarding amplitude and phase provide the soft information regarding the received symbol. The soft information also can be defined by other indicators, such as the position of the symbol on the constellation map, or others.

The soft information can then be used to determine which symbols were received on a subcarrier in a passband, and which symbols were received on a subcarrier in a stopband. The norm of the received symbol relative to the other symbols on a different subcarrier provides an indication of the location of the subcarrier in either a stopband or a passband. That is, a high norm relative to other subcarriers indicates that the subcarrier is located in a passband, and a relatively low norm indicates that the subcarrier is located in a stopband. The likelihood of the received bits of a given symbol can be weighted by the norm of the symbol so that symbols received on passband subcarriers are given more consideration than symbols that are received on stopband subcarriers.

Using the previous techniques, communication from one modem 150 to the next modem 150 can be achieved without knowledge of the characteristics of the transmission medium. The bandwidth of the wideband multi-carrier signal is chosen independently of the environment in which the acoustic network is deployed and can be fixed and chosen at the system design level based on depends on estimated parameters, such as average energy in the acoustic channels, power spectral density of acoustic noise in the environment, design of the characteristics of the piezoelectric sensor, etc. The selected bandwidth can be a universal bandwidth, meaning that it is employed for communication on all segment or portions of the acoustic network.

However, in various embodiments, if a priori information is known regarding the structure of the acoustic network, then the bandwidth can be selected so that the passbands (and not the stopbands) that contain the most acoustic energy are used to transmit information. In such embodiments, the center frequency can be parameterized and the number of subcarriers can be decreased and the code rate can be increased in order to further increase the effective data rate.

System Communication Using Wideband Communications

The foregoing discussion has generally referenced communications between two modems. However, it should be understood that the communication techniques that have been described apply to a network of modems, such as the modems 150a-f shown in FIG. 4, where the communications between the surface and the downhole equipment is effectuated in a series of hops.

In the network illustrated in FIG. 4, the modem 150a closest to the surface is communicatively coupled by the wired connection 220 to the surface control and telemetry system 152. The modem 150f located furthest downhole is configured to exchange information with downhole equipment (i.e., sensor 154). The intermediate modems 150b-e are configured as repeaters that receive and retransmit (and sometimes boost) the message that is being conveyed on the acoustic communications path.

Messages propagate between the downhole equipment and the surface in a series of hops. Messages transmitted by a modem 150a-f generally are broadcast, so that any modem within the acoustic range of the transmitting modem can detect and receive the message. The messages are broadcast in an omnidirectional manner, meaning that modems both upstream and downstream of the transmitting modem can be within the transmitting modem's acoustic range. In various embodiments, each message is locally addressed to a modem in the network, so that a modem within the acoustic range can determine whether it should take any action with respect to a detected message. For instance, upon detection of a message, the modem demodulates and decodes the message. If the message is not locally addressed to the detecting modem, then the detecting receiving modem may take no further action. However, if the message is locally addressed to the receiving modem, then the modem determines whether it should forward the message or execute a command. If the message should be forwarded, the modem encodes and modulates a new message for transmission.

Figure 9:
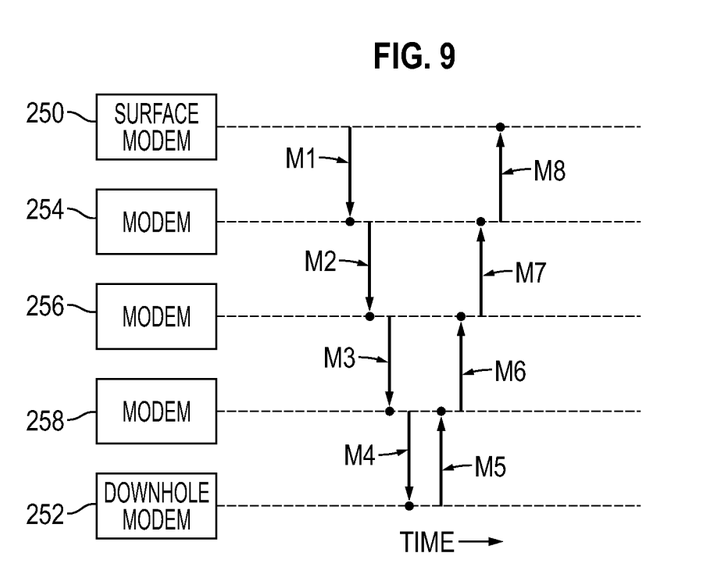
FIG. 9 is a timing diagram illustrating a multi-hop communication technique, according to an embodiment.

An example of an arrangement where messages are received and acted on by modems along the communications path is schematically illustrated in FIG. 9, which is a timing diagram showing the propagation of message via a network of modems at locations that extend between the surface and the downhole equipment. In this example, the network includes one surface modem 250, one downhole modem 252 and three repeater modems 254, 256, 258, although other combinations are possible and contemplated. A user of the system (e.g., a field engineer) initiates communication of a message M1 from the surface control system via a wired communications path to the surface modem 250, where message M1 is locally addressed to the first modem 254. Information contained in the message M1 can be a query or command that is addressed to various downhole equipment. In the embodiment shown, the message M1 includes information that indicates that message M1 is locally addressed to modem 254 in order to eventually reach the downhole equipment through the downhole modem 252.

Modem 254 receives message M1, decodes it, and then encodes a second message M2 that is locally addressed to modem 256 and that includes the query or command contained in message M1. Modem 258 also may have received message M1. However, modem 258 does not act on message M1 because the information contained in message M1 indicates that it is locally addressed to modem 256.

When modem 256 receives message M2, modem 256 decodes it, and then encodes a third message M3 that is locally addressed to modem 258. This procedure repeats until a message that contains the query or command sent from the surface control system reaches the downhole modem 252 which is connected to the downhole equipment.

When the modem 252 receives the last message M4, it decodes the message M4 and executes the query or command. If the message contains a query, then the modem 252 transmits an uplink message M5 that contains, for example, information obtained from the downhole equipment regarding downhole conditions, such as temperature, pressure, working condition of a valve, etc. The uplink message M5 is locally addressed to the modem 258, which decodes it, and then encodes another message M6 that is locally addressed to the next upstream modem 256 in the communication sequence. This process repeats until an uplink message M8 reaches the surface modem 250.

Although in the example described above, downlink and uplink messages were locally addressed to the next adjacent modem along the communications path, it should be understood that the next uplink or downlink modem need not be adjacent the transmitting modem. That is, a message can bypass the next adjacent modem or modems and instead be locally addressed to a further modem that is within the acoustic range of the transmitting modem.

The acoustic range of the transmitting modem can be affected by the noise conditions that are present in the operating environment. As the noise fluctuates during an operation, the signal to noise ratio (SNR) of the acoustic communications also fluctuates. To accommodate for these fluctuations, the communication technique and modem arrangement are designed for the worst case conditions. Consequently, during periods when the SNR is good (i.e., low noise), then the signal (or message) that is transmitted by a particular modem M(X) may also be received by modem M(X+i), where (i>1). As such, if a message is received by a modem M(X+i) (i>1), it can be assumed that the message also is received by modem M(X+(i−1)). To illustrate, if a message sent from surface modem 250 is received by modem 256, it can be assumed that the message also was received by modem 254. Thus, during periods when the SNR is good, overall throughput of messages through the network can be improved. Moreover, should a modem fail (or fail to successfully receive a message) during an operation, network communications can still be completed since another modem can step in and assume the role of the failed modem either permanently or temporarily.

Further, because an acoustic signal transmitted by a modem M is broadcast and is omnidirectional, modems in both upstream and downstream directions can receive a particular signal. Thus, an assumption can be made that the communications channel is reciprocal. That is, if a message transmitted by modem M(X) (e.g., modem 250) is properly received by modem M(X+i) (e.g., modem 256), then a message transmitted by modem M(X+i) (e.g., modem 256) will be properly received by modem M(X) (e.g., modem 250).

Another assumption that can be made is that if a message transmitted by modem M(X) (e.g., modem 250) is properly received by modem M(X+i), (i>1), (e.g., modem 258) then a message transmitted by modem M(X+i) (e.g., modem 258) will be properly received by modem M(X+j) (j>0 and j<i) (e.g., modem 256). These assumptions are applicable in both the uplink and downlink directions.

Figure 10:
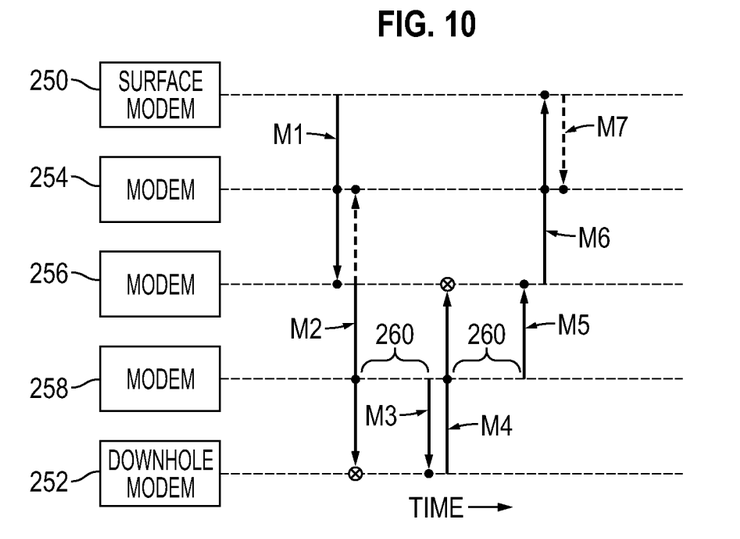
FIG. 10 is a timing diagram illustrating a multi-hop communication technique with implicit acknowledgement, according to an embodiment.

Based on these assumptions, and as illustrated in the timing diagram of FIG. 10, a communication technique can be applied to transmit messages in a communications network, such as a network of acoustic modems that communicatively interconnect a surface control system with downhole equipment. This technique is illustrated in the example shown in FIG. 10, where an "X" indicates that a signal has not been properly received, and a solid circle indicates that a signal has been properly received. In this example, it is assumed that each of the modems 250, 252, 254, 256, 258 can communicate with each of its four neighbor modems, i.e., the two modems above and the two modems below.

Referring to FIG. 10, the modem 250, which is the modem closest to the surface, sends a message M1 that is locally addressed to modem 256. The message M1 can include a query or command that is ultimately addressed to downhole equipment. In this example, both modem 254 and modem 256 receive and decode the message M1. However, because the message M1 is locally addressed to modem 256, modem 254 enters a listening mode where it listens for a communication that confirms that modem 256 has received and acted on the message M1. For instance, if modem 256 sends a further message M2 that is addressed to the downhole equipment and locally addressed to a further downhole modem 258, the modem 254 also will receive the message M2 and deem it as confirmation, or an implicit acknowledgement, that the modem 256 received M1 and that the information contained in message M1 is propagating downlink towards the downhole equipment.

Modem 258 receives and decodes the message M2 and then enters the listening mode to ensure that modem 252 takes the appropriate action after decoding message M2. The time period 260 during which the modem 258 remains in the listening mode is a predetermined time period. To illustrate, the time period 260 of the listening mode is based on the expected length of time it would take for a message to be received and decoded by modem 252 together with the expected length of time it would take for the modem 252 to take action based on the decoded message and for the modem 258 to detect a communication that is indicative of that action. However, the time period can be longer or shorter in different implementations of the network. If the modem 258 detects a communication, it can infer that the message is propagating successfully along the communications path. In other words, the detected communication is an implicit acknowledgement of success.

In this example, modem 252 does not receive message M2, which can occur, for instance, due to interference from noise. Consequently, modem 258 does not detect any activity by modem 252 within the time period 260 of its listening mode and can infer a failure. Thus, modem 258 exits the listening mode and encodes and transmits a message M3 to the modem 252 in order to complete the downlink communication to the downhole equipment. The modem 252 receives the message M3, decodes it, and responds appropriately. In this example, the message M3 includes a query, which the modem 252 responds to by transmitting the requested information in a message M4 that is locally addressed to modem 256 in the uplink direction. Uplink propagation of the message then is implemented in the same manner as described for the downlink propagation.

In this example, modem 256 does not receive message M4. Thus, after modem 258 waits for the duration of its listening time period 262 without seeing activity by modem 256, modem 258 takes action and sends a message M5 that is locally addressed to modem 256. Modem 256 receives message M5, decodes it, and transmits a message M6 that is locally addressed to surface modem 250. Both modem 254 and modem 250 receive message M6. Modem 254 enters its listening mode, and modem 250 decodes message M6 and sends a message M7. Modem 254 detects M7 before the end of its listening time period and infers that the message M7 has been successfully transmitted.

This configuration of the upstream and downstream communications links, which allows modems to be bypassed, can increase the rate at which information can be communicated on the network. The configuration also provides for vertical redundancies so that communications can still be achieved even if a modem in the network fails. That is, if a modem fails (or fails to successfully receive or transmit a message), the listening mode of operation will allow a neighboring modem to infer the failure (based on no detected message on the communications path within the time period) and then step in for the failed modem and complete the communications path between the surface and the downhole equipment.

The bypass communication technique that has just been described can be used in conjunction with the frequency diversity techniques that also have been described herein. Combining frequency diversity with a network configuration where modems can enter a listening mode that allows a bypassed listening modem to infer success or failure of communications can both increase data rates in the communication network and enhance reliability of the network. In addition, as discussed above, the setup time for such a network can be significantly reduced as there is no need to perform a network discovery process. This ability is possible because the same modulation method (encoding, bandwidth usage, etc.) applies to all portions of the acoustic communications path, even if different portions might have different acoustic transmission characteristics. In the example described, the repeaters are spaced apart such that communications are reliable between one modem and each of its two neighbors in both the upstream and downstream directions. However, with frequency diversity techniques, even greater degrees of vertical redundancy are possible because the same modulation method (including use of a universal bandwidth) is used throughout the network.

Figure 11:
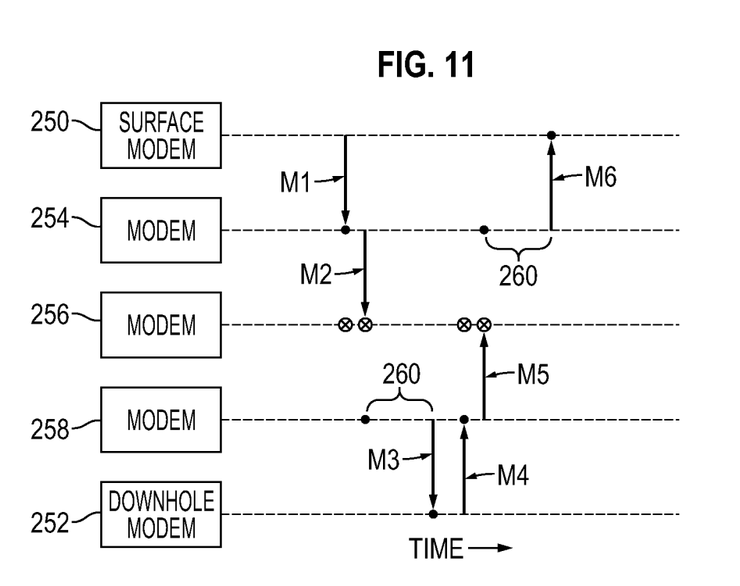
FIG. 11 is a timing diagram illustrating a multi-hop communication technique with implicit acknowledgement, according to another embodiment.

FIG. 11 shows another timing diagram of a multi-hop communication technique. In this embodiment, messages are locally addressed to the next adjacent modem in the network. That is, in the downlink direction, messages from surface modem 250 are locally addressed to modem 254; messages from modem 254 are locally addressed to modem 256; messages from modem 256 are locally addressed to modem 258; and so forth. Communications in the uplink direction propagate in the similar manner. Thus, under normal operation, messages may propagate at a slower rate through the network than the embodiment described with reference to FIG. 10.

However, the arrangement represented by FIG. 11 still provides for vertical redundancies. In the example shown, modem 256 has failed (or is not successfully receiving and/or transmitting messages). Thus, modem 256 does not receive the message M2 transmitted by modem 254 in response to message M1 from the surface modem 250. However, modem 258 is in the acoustic range of modem 254 and, thus, has received and decoded message M2. Because message M2 is locally addressed to modem 254, modem 258 enters its listening mode. If modem 258 does not detect a message from modem 254 within the listening time period 260, then modem 258 takes over and sends a message M3 to the downhole modem 260 that contains the information that modem 256 should have sent. This same process repeats in the uplink direction, with vertical redundancy again ensuring that communications on the network can be sustained between the surface modem 250 and the downhole modem 252.

Although the embodiments have been discussed above with reference to acoustic modems deployed in a wellbore, it should be understood that the communication techniques and arrangements disclosed herein are not limited to wellbores, but are applicable in other contexts where an elastic medium is used to acoustically convey messages between components.

Although the preceding description has been described herein with reference to particular means, materials and embodiments, it is not intended to be limited to the particulars disclosed here; rather, it extends to all functionally equivalent structures, methods and uses, such as are within the scope of the appended claims.

The invention claimed is:

1. A method of communicating in a borehole, comprising:
   transmitting messages via an acoustic communications medium interconnecting a network of acoustic modems deployed in the borehole, the acoustic communications medium characterized by an acoustic transfer function having a plurality of passbands and a plurality of stopbands, wherein characteristics of the acoustic transfer function change along the acoustic communications medium, wherein transmitting includes:
   encoding each message into a plurality of symbols representing the message; and
   distributing the plurality of symbols over an entire pre-selected bandwidth of a wideband acoustic signal, wherein the bandwidth spans at least one passband and at least one stopband of the acoustic transfer function, wherein the same pre-selected bandwidth is used to transmit messages between all the acoustic modems deployed in the wellbore, and wherein each message is encoded and distributed by a transmitting acoustic modem over the same entire pre-selected bandwidth without regard to the current characteristics of the acoustic transfer function corresponding to the specific portion of the acoustic communications medium between the transmitting acoustic modem and a receiving acoustic modem; and receiving and processing the wideband acoustic signals to recover the messages.

2. The method as recited in claim 1, wherein the plurality of symbols are distributed over the bandwidth using Orthogonal Frequency Division Multiplexing (OFDM).

3. The method as recited in claim 1, wherein the message is encoded using Forward Error Correction (FEC).

4. The method as recited in claim 2, wherein the message is encoded using Forward Error Correction (FEC).

5. The method as recited in claim 4, wherein the message is recovered from the plurality of symbols using maximal combining ratio coding.

6. The method as recited in claim 1, further comprising selecting the bandwidth of the wideband acoustic signal before deploying the acoustic modems in the borehole.

7. A method of transmitting messages in an acoustic communications network, comprising:
   transmitting onto a first portion of an acoustic transmission medium a first message in a first wideband acoustic signal from a first acoustic modem in a network of acoustic modems deployed along the acoustic transmission medium, the message being addressed to a second acoustic modem and containing information to be re-transmitted by the second acoustic modem, wherein the acoustic transmission medium is characterized by an acoustic transfer function having passbands and stopbands, wherein the acoustic transfer function has transmission characteristics that are different on the first portion than on a second portion of the transmission medium, wherein the first wideband acoustic signal is defined by a pre-selected bandwidth that spans at least one passband and at least one stopband of the acoustic transfer function, and wherein transmitting the first message includes distributing the first message across the entire pre-selected bandwidth;
   determining, by a third acoustic modem, whether the second modem has received the first message; and, if not
   transmitting on the second portion of the transmission medium, by the third acoustic modem, a second message in a second wideband acoustic signal containing the information that was to be re-transmitted by the second acoustic modem, wherein the second wideband acoustic signal is defined by the same pre-selected bandwidth, wherein transmitting the second message comprises distributing the second message across the entire pre-selected bandwidth without determining current transmission characteristics of the second portion of the transmission medium.

8. The method as recited in claim 7, wherein determining whether the first message has been received by the second acoustic modem comprises:
   receiving, by the third acoustic modem, the first message; and
   detecting whether the second acoustic modem transmits a message before elapse of a predetermined time period, and, if not, inferring that the second acoustic modem did not receive the first message.

9. The method as recited in claim 8, wherein determining whether the first message has been received by the second acoustic modem comprises:

upon receipt of the first message by the third acoustic modem, entering by the third acoustic modem a listening mode for the predetermined time period; and
transmitting the second message upon the elapse of the predetermined time period based on inferring that the second acoustic modem did not receive the first message.

10. The method as recited in claim 7, wherein transmitting the first message comprises:
    encoding the first message into a plurality of symbols representing the first message; and
    distributing the plurality of symbols across the entire pre-selected bandwidth of the first wideband acoustic signal.

11. The method as recited in claim 10, wherein transmitting the second message comprises:
    encoding the second message into a plurality of symbols; and
    distributing the plurality of symbols across the entire pre-selected bandwidth of the second wideband acoustic signal.

12. The method as recited in claim 11, wherein the first message and the second message are encoded using Forward Error Correction (FEC).

13. The method as recited in claim 11, wherein the plurality of symbols of the first message and the plurality of symbols of the second message are distributed across the same bandwidth using Orthogonal Frequency Division Multiplexing (OFDM).

14. The method as recited in claim 7, wherein the third acoustic modem is deployed at a location along the acoustic transmission medium that is located between the first acoustic modem and the second acoustic modem.

15. A system for performing a downhole operation in a wellbore, comprising:
    a control and telemetry system located at a surface to control and monitor a downhole operation;
    downhole equipment located in the wellbore to observe a parameter of interest associated with the downhole operation;
    first, second and third acoustic modems coupled to an acoustic transmission medium at respective locations extending between the control and telemetry system and the downhole equipment, wherein the acoustic transmission medium has an acoustic frequency response comprising passbands and stopbands, and wherein characteristics of the acoustic frequency response differ between a first portion and a second portion of the transmission medium,
    wherein in response to receipt of a message directed to the downhole equipment, the first acoustic modem generates information representing the message, distributes the information across an entire bandwidth that spans at least one passband and at least one stopband of the acoustic frequency response to generate a first wideband signal, and acoustically transmits the first wideband signal to the second acoustic modem on the acoustic transmission medium,
    wherein the first acoustic modem generates and distributes the information across the bandwidth without regard to whether first wideband signal is to be transmitted over the first portion or the second portion of the transmission medium.

16. The system as recited in claim 15, wherein the second acoustic modem receives the first wideband signal and processes the first wideband signal to recover the message.

17. The system as recited in claim 16, wherein, in response to the message, the second acoustic modem retrieves from the downhole equipment data representative of the parameter of interest and transmits a second wideband signal containing information corresponding to the retrieved data for receipt by the control and telemetry system, wherein the information contained in the second wideband signal is distributed across the same entire bandwidth and without regard to whether the second wideband signal is to be transmitted on the first portion or the second portion of the transmission medium.

18. The system as recited in claim 17,
wherein upon receipt of a wideband acoustic signal that is not addressed to the third acoustic modem, the third acoustic modem monitors the acoustic transmission medium for a predetermined time period to determine whether an addressed acoustic modem has transmitted a message, and, if not,
upon elapse of the predetermined time period, the third acoustic modem transmits a third wideband acoustic signal containing information that should have been transmitted in the message by the addressed acoustic modem, and wherein the third acoustic modem distributes the information across the same entire bandwidth and without regard to whether the third wideband acoustic signal is to be transmitted on the first portion or the second portion of the transmission medium.

19. The system as recited in claim 18, wherein the third acoustic modem is coupled to the acoustic transmission medium at a location between the first acoustic modem and the second acoustic modem.

\* \* \* \* \*